US012615073B2

(12) United States Patent
Tsodik et al.

(10) Patent No.: US 12,615,073 B2
(45) Date of Patent: Apr. 28, 2026

(54) TECHNIQUES FOR MULTI-ACCESS POINT JOINT SOUNDING

(71) Applicant: HUAWEI TECHNOLOGIES CO., LTD., Shenzhen (CN)

(72) Inventors: Genadiy Tsodik, Hod Hasharon (IL); Shimon Shilo, Hod Hasharon (IL); Oded Redlich, Hod Hasharon (IL); Arik Klein, Hod Hasharon (IL); Avner Epstein, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 320 days.

(21) Appl. No.: 18/355,953

(22) Filed: Jul. 20, 2023

(65) Prior Publication Data

US 2023/0361815 A1     Nov. 9, 2023

Related U.S. Application Data

(63) Continuation of application No. PCT/EP2021/051239, filed on Jan. 21, 2021.

(51) Int. Cl.
*H04W 24/08*     (2009.01)
*H04B 7/024*     (2017.01)
(Continued)

(52) U.S. Cl.
CPC ............ *H04B 7/024* (2013.01); *H04W 24/08* (2013.01); *H04W 48/12* (2013.01); *H04W 84/12* (2013.01)

(58) Field of Classification Search
CPC ..... H04W 24/08; H04W 48/12; H04W 84/12; H04W 72/231; H04W 72/0446;
(Continued)

(56) References Cited

U.S. PATENT DOCUMENTS

| | | | | |
|---|---|---|---|---|
| 9,572,063 | B2 * | 2/2017 | Etemad | H04L 41/082 |
| 12,058,213 | B2 * | 8/2024 | Zou | H04L 63/0861 |
| 2021/0045105 | A1 * | 2/2021 | Yoon | H04W 72/21 |

FOREIGN PATENT DOCUMENTS

| | | |
|---|---|---|
| CN | 109547072 A | 3/2019 |
| CN | 113037400 A | 6/2021 |
| CN | 113395701 A | 9/2021 |

OTHER PUBLICATIONS

"IEEE P802.11be™/D0.01, Draft Standard for Information technology—Tele-communications and information exchange between systems Local and metropolitan area networks—Specific requirements, Part 11:Wireless LAN Medium Access Control (MAC) and Physical Layer (PHY) Specifications, Amendment 7: Enhancements for extremely high throughput (EHT)," IEEE Computer Society, Total 33 pages (Jul. 2020).

(Continued)

*Primary Examiner* — Wei Zhao
(74) *Attorney, Agent, or Firm* — Leydig, Voit & Mayer, Ltd.

(57)     ABSTRACT

The present disclosure relates to a network device for announcing a multi-access point (M-AP), joint channel sounding procedure in a WiFi network for acquiring channel state information between multiple access points (APs), which belong to a same M-AP set, and multiple stations associated with at least one of those multiple APs, wherein the network device is an access point of a subset of the M-AP set which subset includes APs that are configured to transmit an announcement frame, the network device comprising: a processor configured to provide the announcement frame of the M-AP joint channel sounding procedure, wherein the announcement frame comprises an identification of the M-AP set and identifications of the APs, associated to the subset of the M-AP set which subset of APs is (Continued)

configured to transmit the announcement frame; and a transceiver configured to transmit the announcement frame.

20 Claims, 17 Drawing Sheets

(51) Int. Cl.
*H04W 48/12* (2009.01)
*H04W 84/12* (2009.01)

(58) Field of Classification Search
CPC ... H04W 72/23; H04W 84/18; H04W 72/044; H04L 29/08; H04B 7/024; H04B 7/02
See application file for complete search history.

(56) References Cited

OTHER PUBLICATIONS

Yu et al., "Sounding procedure in AP collaboration," IEEE 802.11-19/1097r0, Total 11 pages (Jul. 2019).
"IEEE P802.11ax™/D8.0, Draft Standard for Information technology—Tele-communications and information exchange between systems Local and metropolitan area networks—Specific requirements, Part 11:Wireless LAN Medium Access Control (MAC) and Physical Layer (PHY) Specifications, Amendment 1: Enhancements for High Efficiency WLAN," Total 820 pages (Oct. 2020).
Jiang et al., "Channel Sounding for Multi-AP CBF," IEEE 802.11-20-0123-00-00be, Total 14 pages (Jan. 2019).

* cited by examiner

Figure 1:
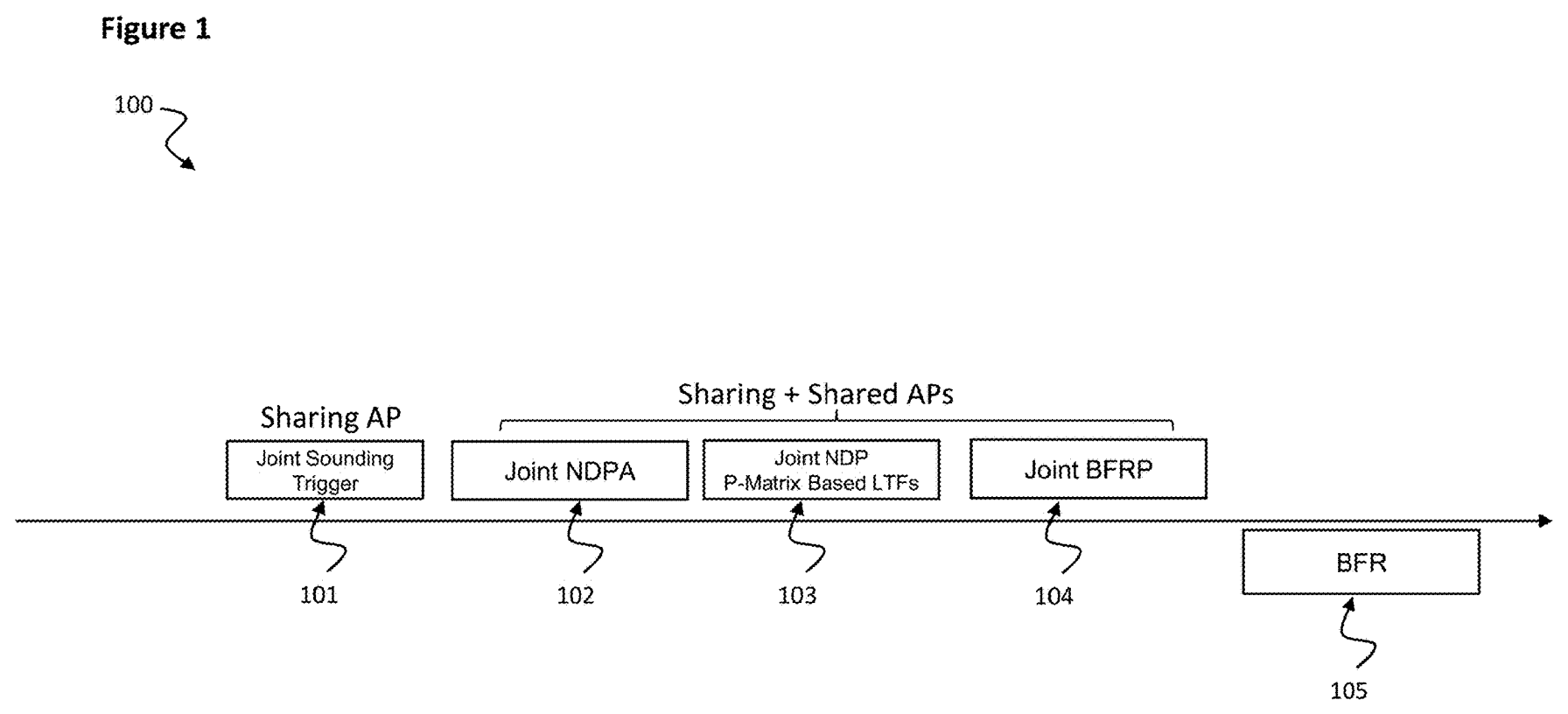

Sharing AP

Sharing + Shared APs

| Joint Sounding Trigger | Joint NDPA | Joint NDP P-Matrix Based LTFs | Joint BFRP | BFR |

101　　102　　103　　104　　105

400

500

M-AP Set Info
Subblock

501 — M-AP Set ID — 8 bits

502 — # of APs — 4 bits

503 — AP 1 ID — 11 bits

504 — AP 1 STS Indication — 8 bits

505 — AP N ID — 11 bits

506 — AP N STS Indication — 8 bits

507 — Padding — N bits

700

900

1100

1300

AP Info Subfield

1401 → Requesting AP ID — 11 bits

1402 → Requested AP ID — 11 bits

1403 → Number of STA Info Subfields — 4 bits

1404 → Reserved — 6 bits

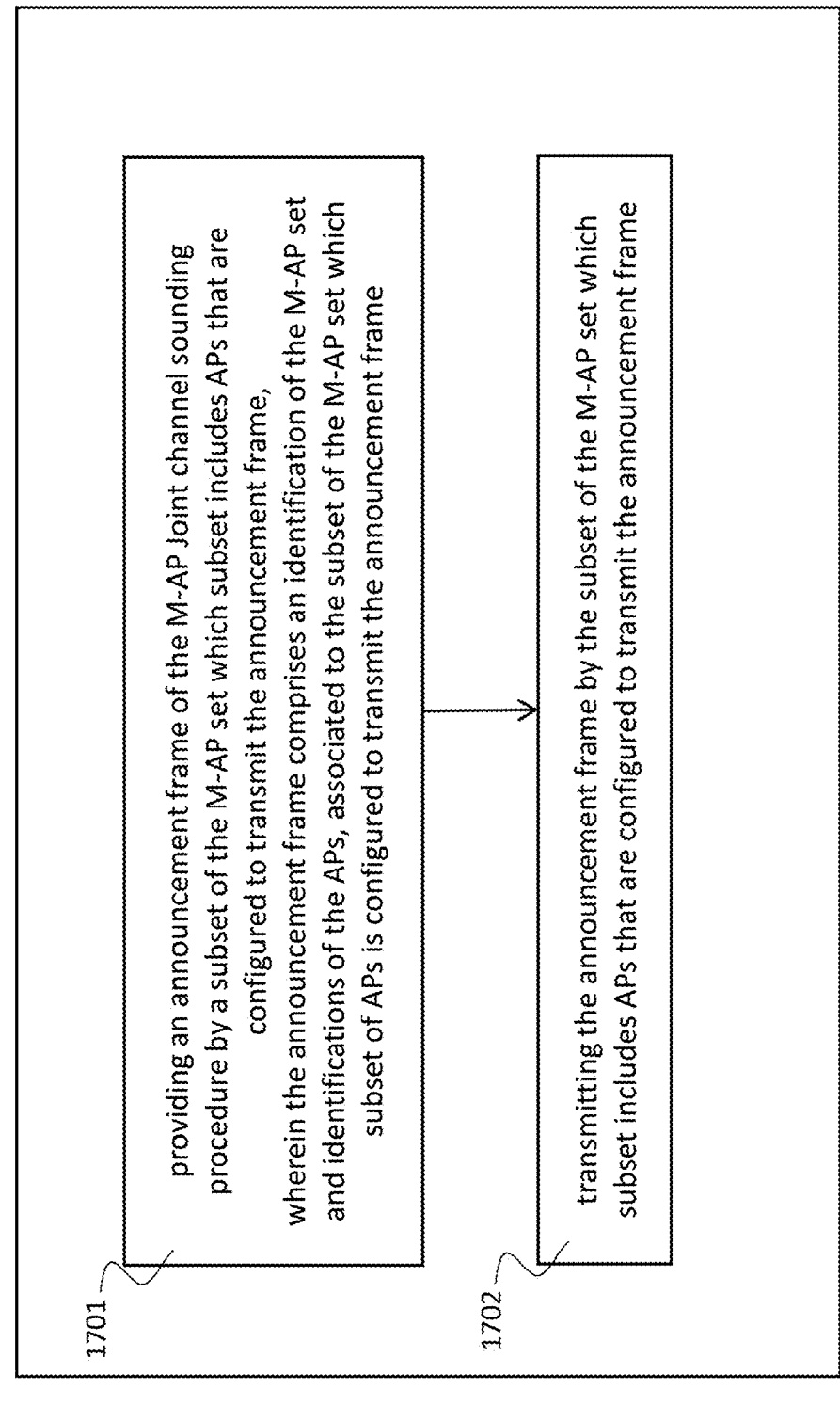

1701 providing an announcement frame of the M-AP joint channel sounding procedure by a subset of the M-AP set which subset includes APs that are configured to transmit the announcement frame,
wherein the announcement frame comprises an identification of the M-AP set and identifications of the APs, associated to the subset of the M-AP set which subset of APs is configured to transmit the announcement frame

1702 transmitting the announcement frame by the subset of the M-AP set which subset includes APs that are configured to transmit the announcement frame

TECHNIQUES FOR MULTI-ACCESS POINT JOINT SOUNDING

CROSS-REFERENCE TO RELATED APPLICATIONS

This application is a continuation of International Application No. PCT/EP2021/051239, filed on Jan. 21, 2021, the disclosure of which is hereby incorporated by reference in its entirety.

TECHNICAL FIELD

The present disclosure relates to techniques for Multi-Access Point (M-AP) Joint Sounding in WiFi networks. In particular, the disclosure relates to a new frame format of an announcement frame, in particular an NDPA (Null Data Packet Announcement) frame, for M-AP Joint Sounding.

BACKGROUND

The WiFi standard IEEE 802.11be recently agreed on coordination between multiple Access Points (APs) and defined an initial terminology for Multi-AP coordination. In order to support MIMO (Multiple Input Multiple Output) based coordination scheme it was agreed on two sounding methods: IEEE 802.11be shall provide Joint NDP sounding scheme or Sequential sounding scheme for Multi-AP. In Joint Sounding participated APs transmit in parallel NDPA and NDP frames to single or multiple stations (STAs) from different BSSs (base station subsystems) within the M-AP set.

IEEE 802.11be introduces a Multi AP (M-AP) coordinated transmission where a predefined group of APs may initiate concurrent frame exchange within a limited time period. M-AP transmissions may include parallel transmissions using MU-MIMO (multi-user MIMO) coordination schemes. In this case the data PPDU (Physical Layer Protocol Data Unit) may be preceded with an M-AP Channel Sounding procedure.

In order to support sounding procedure that involves multiple APs and multiple STAs associated with different APs there is a need to develop new methods and new frame formats.

SUMMARY

It is the object of this disclosure to provide a framework for a sounding procedure for Multi-AP coordinated transmission, in particular M-AP coordinated transmission that involves multiple APs and multiple STAs associated with different APs.

In particular, it is an object of this disclosure to derive new frame formats and new methods for the Joint NDP sounding scheme according to IEEE 802.11be in order to support sounding based on multiple APs and multiple STAs associated with different APs.

This object is achieved by the features of the independent claims. Further implementation forms are apparent from the dependent claims, the description and the figures.

A basic concept of this disclosure is to define a new frame format for NDPA frame and to provide a new design and new modules for Joint Sounding procedure. A new format of NDPA frame is introduced that includes two fundamental properties required by Joint NDPA for Joint Sounding: 1) Special TA indication that prevents Legacy devices from decoding this NDPA type; 2) Indication of both M-AP Set ID and all the AP IDs as the only solution that allows correct operation of all the receivers. The following new design and modules are introduced: Division of NDPA to modules that allows flexible indication of all the sounding parameters requested by the APs from specific STAs; New efficient STS (space-time stream) indication per AP; New STA/M-AP Info Subblocks are designed; New AP Info Subfield design to allow indication of a specific AP info.

The concept according to this disclosure provides a good technical solution covering all the currently open issues of Joint Sounding which are as follows:

1) Joint Sounding NDPA is a new frame type (different from VHT/HE/EHT NDPA frame). The solution presented in this disclosure introduces a definition for such a new frame type.

2) Multiple TA (transmit address) indication: NDPA (similarly to other 802.11 frames) allows a single TA indication. The solution presented in this disclosure provides a new identifier to indicate that multiple APs are the transmitting entities of this frame. The quantity of APs may vary. The solution presented in this disclosure allows correct recognition of all the transmitters, where the exact quantity is unknown.

3) The quantity of Tx antennas (Nr) indication per AP. Current NDPA format does not include Nr indication (it is indicated by NDP frame), The solution presented in this disclosure adds a new field.

4) Allowing each STA to uniquely recognize itself within M-AP set. Using AID is insufficient since different STAs from different BSS may have same AID. The solution presented in this disclosure allows each STA to uniquely recognize itself within M-AP set.

5) M-AP Joint NDPA frame involves multiple transmitters that can be part of multiple M-AP sets. The solution presented in this disclosure indicates both the identifier of specific M-AP Set and also unique identifiers of all the transmitters. Missing one of those identifiers will prevent the receivers to detect Joint NDPA correctly.

6) Preventing Legacy devices from identifying Joint NDPA frame as VHT/HE/EHT (single AP) NDPA frame. The solution presented in this disclosure defines how to prevent Legacy devices from identifying Joint NDPA frame as VHT/HE/EHT (single AP) NDPA frame. With no such a functionality new NDPA format cannot be designed.

7) Only Nc is signaled per AP and for all the APs; however, some APs (not necessarily all the APs) may request different sounding feedback parameters from specific STAs. The solution presented in this disclosure provides a more flexible solution.

8) AP Information indication (STS) are separated from AP ID indication. The solution presented in this disclosure provides a definition of two new fields instead of combining them to single field dedicated to signaling of AP Info.

9) The solution presented in this disclosure provides a more efficient indication of STS parameters.

The solution presented in this disclosure is based on the following assumptions: Each M-AP set has unique M-AP Set ID; Each AP within M-AP Set has unique AP ID; STA ID is uniquely defined by combination of STA ID and AP ID.

In order to describe the present disclosure in detail, the following terms, abbreviations and notations will be used:

AP Access point according to WiFi notation

M-AP Multi-Access Point

STA Station according to WiFi notation

NDP Null Data Packet

NDPA Null Data Packet Announcement
TA Transmitter Address
RA Receiver Address
STS Space-Time Stream
ID Identification, Identifier
PPDU Physical Layer Protocol Data Unit
TF Trigger Frame
BW bandwidth
MIMO Multiple-Input Multiple-Output
MU multi-user
Nc quantity of spatial streams
Nr quantity of transmit antennas
Tx Transmit
Rx Receive
BSS Base Station Subsystem
AID11 STA ID of 11 bits as defined by IEEE 802.11ax
FCS Frame Check Sequence According to a first aspect, the disclosure relates to a network device for announcing a Multi-Access Point, M-AP, Joint channel sounding procedure in a WiFi network for acquiring channel state information, CSI, between multiple Access Points, APs, which belong to a same M-AP set, and multiple stations, STAs, associated with at least one of those multiple APs, wherein the network device is an Access Point of a subset of the M-AP set which subset includes APs that are configured to transmit an announcement frame, the network device comprising: a processor configured to provide the announcement frame of the M-AP Joint channel sounding procedure, wherein the announcement frame comprises an identification of the M-AP set and identifications of the APs, AP IDs, associated to the subset of the M-AP set which subset of APs is configured to transmit the announcement frame; and a transceiver configured to transmit the announcement frame.

Such a network device supports a sounding procedure for Multi-AP coordinated transmission which involves multiple APs and multiple STAs associated with different APs. The network device supports operation of the WiFi network based on new frame formats and new methods for the Joint NDP sounding scheme according to IEEE 802.11be.

In an exemplary implementation of the network device, the announcement frame is a Joint Null Data Packet Announcement, Joint NDPA, frame of a new frame type that is different from existing NDPA frame types according to the IEEE 802.11be WiFi standard.

This new frame type supports the sounding procedure for Multi-AP coordinated transmission with multiple APs and multiple STAs associated with different APs.

In an exemplary implementation of the network device, the Joint NDPA frame is transmitted on the same time-frequency resources with the same payload information by all APs belonging to the subset of the M-AP set which subset is configured to transmit the announcement frame.

This feature provides the advantage that the same sounding frame is transmitted by all APs belonging to this subset of the M-AP set.

In an exemplary implementation of the network device, the announcement frame comprises an indication of a broadcast transmitter address (TA), e.g. as illustrated in FIG. 4.

Such an announcement frame with broadcast TA indication prevents Legacy devices from decoding the new Joint NDPA frame type.

In an exemplary implementation of the network device, the announcement frame comprises: an M-AP Set Info Subblock including information about the M-AP set; and a plurality of STA Info Subblocks indicating sounding parameters requested by one or more specific APs of the M-AP set from one or more specific STAs of the multiple STAs, e.g. as illustrated in FIG. 4.

Such an announcement frame allows a unique identification of all the transmitters that can be part of multiple M-AP sets.

In an exemplary implementation of the network device, the M-AP Set Info Subblock comprises: the M-AP set ID; and the AP IDs belonging to the subset of the M-AP set which subset is configured to transmit the announcement frame, e.g. as illustrated in FIG. 5.

Such an implementation of the M-AP Set Info Subblock allows a unique identification of all transmitters belonging to the subset of the M-AP set which are configured to transmit the announcement frame.

The M-AP Set ID is a unique identification of the M-AP set in order to distinguish the M-AP Set from other M-AP Sets.

In an exemplary implementation of the network device, the M-AP Set Info Subblock comprises: a quantity of APs transmitting the announcement frame of the M-AP Joint channel sounding procedure, e.g. as illustrated in FIG. 5.

Such an implementation of the M-AP Set Info Subblock allows an exact identification of the quantity of APs in the M-AP set which are configured to transmit the announcement frame.

In an exemplary implementation of the network device, the M-AP Set Info Subblock comprises: a space time stream, STS, indication for all APs belonging to the subset of the M-AP set, e.g. as illustrated in FIG. 5.

Such an implementation of the M-AP Set Info Subblock allows an exact determination of the respective space time streams for all APs in the M-AP set which are configured to transmit the announcement frame.

In an exemplary implementation of the network device, the STS indication comprises: an indication of a first STS allocated to a respective AP of the APs belonging to the subset of the M-AP set, and a quantity of STSs allocated to the respective AP, e.g. as illustrated in FIG. 6.

Such an implementation of the STS indication allows an efficient indication of the respective STSs allocated to the APs of the subset.

In an exemplary implementation of the network device, the STS indication comprises: a total number of STSs allocated to the APs belonging to the subset of the M-AP set which subset is configured to transmit the announcement frame, and an indication of a first STS allocated per AP, the first STS indication starting from a second AP of the APs belonging to the subset of the M-AP set, e.g. as illustrated in FIG. 7.

Such an implementation of the STS indication is an alternative that also allows an efficient indication of the respective STSs allocated to the APs of the subset.

In an exemplary implementation of the network device, the STS indication comprises: a total number of STSs allocated to the APs belonging to the subset of the M-AP set, and an indication of a last STS allocated per AP, the last STS indication ending with a second last AP of the APs belonging to the subset of the M-AP set, e.g. as illustrated in FIG. 8.

Such an implementation of the STS indication is a further alternative that also allows an efficient indication of the respective STSs allocated to the APs of the subset.

In an exemplary implementation of the network device, each STA Info Subblock of the plurality of STA Info Subblocks indicates only one STA and one or more APs, e.g. as illustrated in FIG. 9.

Such an implementation of the STA Info Subblock allows an efficient indication of sounding parameters.

In an exemplary implementation of the network device, each STA Info Subblock of the plurality of STA Info Subblocks indicates sounding parameters as requested by one or more APs from a specific STA.

Such an implementation of the STA Info Subblock also allows an efficient indication of sounding parameters.

In an exemplary implementation of the network device, each STA Info Subblock of the plurality of STA Info Subblocks comprises an identification of the specific STA, wherein the identification of the specific STA comprises a combination of: an AP ID of an AP of the M-AP set with which AP the specific STA is associated with; and a STA identification AID11 as defined by the IEEE 802.11ax WiFi standard, e.g. as illustrated in FIGS. 9 to 11.

AID11 is defined by IEEE 802.11ax and reused by IEEE 802.11be.

Such an implementation of the STA Info Subblock provides an efficient identification of a respective station.

In an exemplary implementation of the network device, each specific STA Info Subblock of the plurality of STA Info Subblocks comprises a quantity of AP Info Subfields indicating a quantity of APs that request sounding parameters from the specific STA indicated by the specific STA Info Subblock, e.g. as illustrated in FIGS. 9 to 11.

Such an implementation of the STA Info Subblock provides an efficient indication of the APs that request sounding parameters from a specific station.

In an exemplary implementation of the network device, each specific STA Info Subblock of the plurality of STA Info Subblocks comprises an AP Info Subfield, the AP Info Subfield comprising: an indication of a specific AP of the M-AP set which requests the sounding parameters from the specific STA, and the sounding parameters requested by the specific AP, e.g. as illustrated in FIG. 12.

Such an implementation of the STA Info Subblock provides an alternative efficient indication of the APs that request sounding parameters from a specific station.

In an exemplary implementation of the network device, a format of the AP Info Subfield corresponds to a format of a STA Info Subfield as defined by the IEEE 802.11be WiFi standard in which an AID11 field is replaced by an indication of the specific AP of the M-AP set which requests the sounding parameters from the specific STA indicated by the specific STA Info Subblock, e.g. as illustrated in FIG. 12.

Such an implementation of the STA Info Subblock provides a further alternative efficient indication of the APs that request sounding parameters from a specific station.

In an exemplary implementation of the network device, each STA Info Subblock of the plurality of STA Info Subblocks comprises an indication format bit for indicating whether all APs that request sounding parameter from the specific STA request the same sounding parameters, e.g. as illustrated in FIGS. 10 and 11.

Such an implementation of the STA Info Subblock facilitates indication of the sounding parameters by reducing redundant data transmission.

In an exemplary implementation of the network device, the indication format bit indicates different sounding parameters per AP.

Such an implementation of the STA Info Subblock facilitates indication of the sounding parameters by indicating whether different sounding parameters apply per AP.

In an exemplary implementation of the network device, the indication format bit indicates the same sounding parameters for all APs.

Such an implementation of the STA Info Subblock facilitates indication of the sounding parameters by indicating whether the same sounding parameters may be used in order to reduce redundant data transmission.

In an exemplary implementation of the network device, each STA Info Subblock of the plurality of STA Info Subblocks indicates sounding parameters as requested by a specific AP of the M-AP set from multiple STAs that are associated with the specific AP.

Such an implementation of the STA Info Subblock provides an efficient indication of the sounding parameters.

In an exemplary implementation of the network device, a STA Info Subblock of the plurality of STA Info Subblocks comprises an AP Info Subfield, the AP Info Subfield comprising: an indication of a specific AP of the M-AP set which requests the sounding parameters, an indication of a specific AP of the M-AP set with which the one or more specific STAs of the multiple STAs are associated with, and a quantity of STA Info Subfields included in the AP Info Subfield, e.g. as illustrated in FIG. 14.

Such an implementation of the STA Info Subblock provides an efficient indication of the requesting AP and the requested AP.

In an exemplary implementation of the network device, the STA Info Subblock comprises a plurality of STA Info Subfields according to the quantity of STA Info Subfields included in the AP Info Subfield, e.g. as illustrated in FIGS. 13 and 14.

Such an implementation of the STA Info Subblock provides an efficient indication of the respective STA Info Subfields.

In an exemplary implementation of the network device, a format of the STA Info Subfields corresponds to a format of a STA Info Subfield as defined by the IEEE 802.11be WiFi standard.

Such STA Info Subfields can be easily implemented based on the IEEE 802.11be WiFi standard implementation.

According to a second aspect, the disclosure relates to a method for announcing a Multi-Access Point (M-AP) Joint channel sounding procedure in a WiFi network for acquiring channel state information (CSI) between multiple Access Points (APs) which belong to a same M-AP set, and multiple stations (STAs) associated with at least one of those multiple APs, the method comprising: providing an announcement frame of the M-AP Joint channel sounding procedure by a subset of the M-AP set which subset includes APs that are configured to transmit the announcement frame, wherein the announcement frame comprises an identification of the M-AP set, M-AP set ID, and identifications of the APs, AP IDs, associated to the subset of the M-AP set which subset of APs is configured to transmit the announcement frame; and transmitting the announcement frame by the subset of the M-AP set which subset includes APs that are configured to transmit the announcement frame.

Such a method supports a sounding procedure for Multi-AP coordinated transmission which involves multiple APs and multiple STAs associated with different APs. The method supports operation of the WiFi network based on new frame formats and new methods for the Joint NDP sounding scheme according to IEEE 802.11be.

In an exemplary implementation of the method, the announcement frame is a Joint Null Data Packet Announcement, Joint NDPA, frame of a new frame type that is different from existing NDPA frame types according to the IEEE 802.11be WiFi standard.

This new frame type supports the sounding procedure for Multi-AP coordinated transmission with multiple APs and multiple STAs associated with different APs.

In an exemplary implementation of the method, the method comprises: transmitting the Joint NDPA frame on the same time-frequency resources with the same payload information by all APs belonging to the subset of the M-AP set which subset is configured to transmit the announcement frame.

This feature provides the advantage that the same sounding frame is transmitted by all APs belonging to this subset of the M-AP set.

According to a third aspect, the disclosure relates to a station (STA), comprising: a transceiver, configured to receive an announcement frame for announcing a Multi-Access Point, M-AP, Joint channel sounding procedure in a WiFi network for acquiring channel state information, CSI, between multiple Access Points, APs, which belong to a same M-AP set, and multiple stations, STAs, associated with at least one of those multiple APs, wherein the announcement frame is received from an AP of a subset of the M-AP set which subset includes APs that are configured to transmit the announcement frame; and a processor, configured to determine, based on the announcement frame, an identification of the M-AP set, M-AP set ID, and identifications of the APs, AP IDs, associated to the subset of the M-AP set which subset of APs is configured to transmit the announcement frame.

Such a station supports a sounding procedure for Multi-AP coordinated transmission which involves multiple APs and multiple STAs associated with different APs. The station supports operation of the WiFi network based on new frame formats and new methods for the Joint NDP sounding scheme according to IEEE 802.11be.

According to a fourth aspect, the disclosure relates to a computer program product including computer executable code or computer executable instructions that, when executed, causes at least one computer to execute the method according to the second aspect described above. Such a computer program product may include a non-transient readable storage medium storing program code thereon for use by a processor, the program code comprising instructions for performing the methods or the computing blocks as described hereinafter.

Such a computer program product provides an efficient implementation of the techniques described in this disclosure on a computer, processor or any other processing device, e.g. access point or station as described in this disclosure.

BRIEF DESCRIPTION OF THE DRAWINGS

Further embodiments of the present disclosure will be described with respect to the following figures, in which:

FIG. 1 shows a flow diagram illustrating a Joint sounding procedure 100 according to the disclosure;

8

Figure 7:
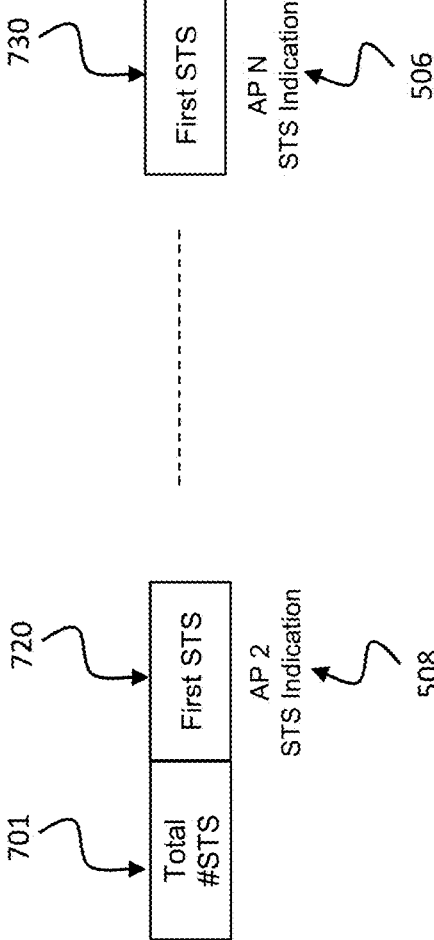
Figure 8:
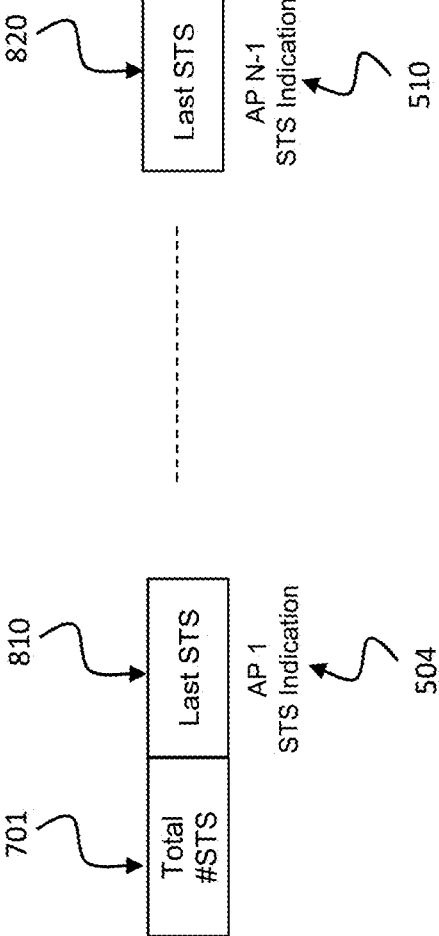
Figure 9:
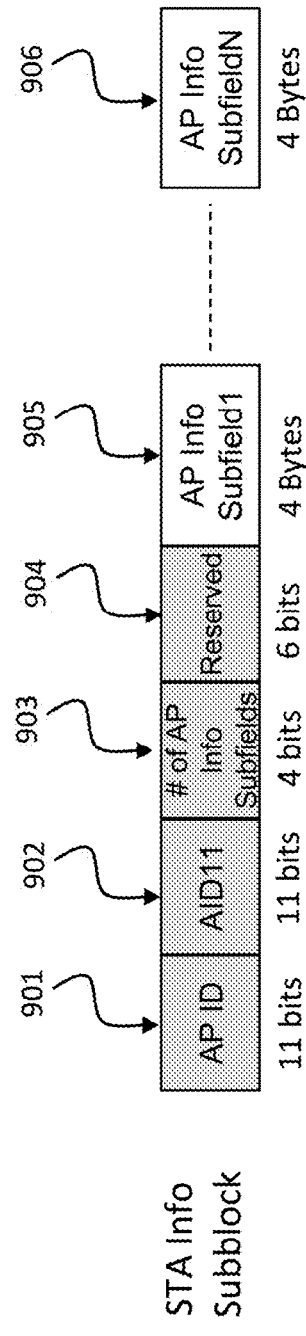
Figure 10:
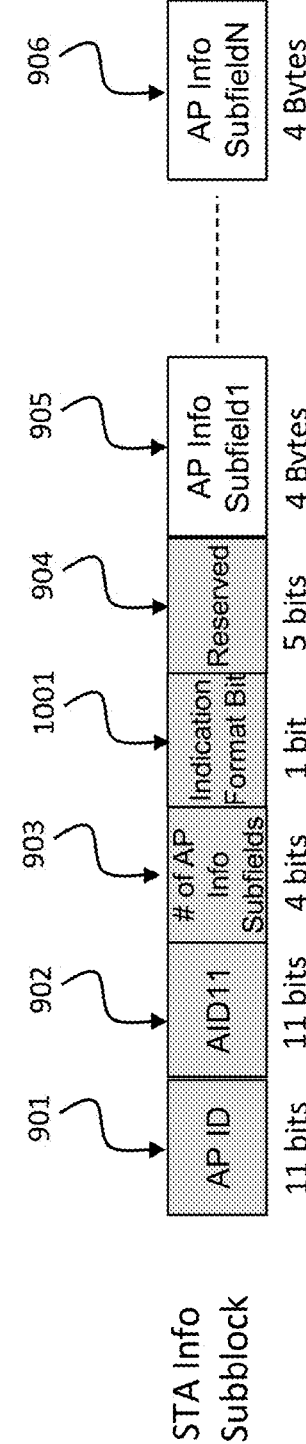
Figure 11:
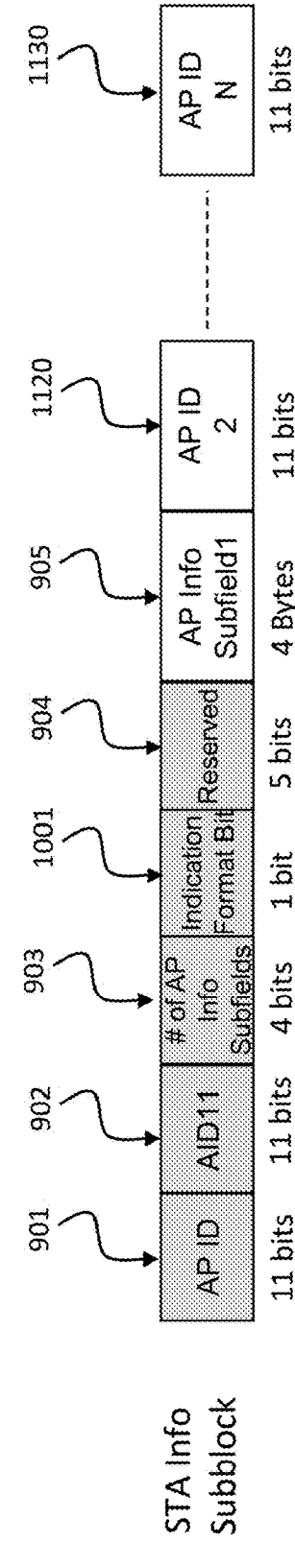
Figure 12:
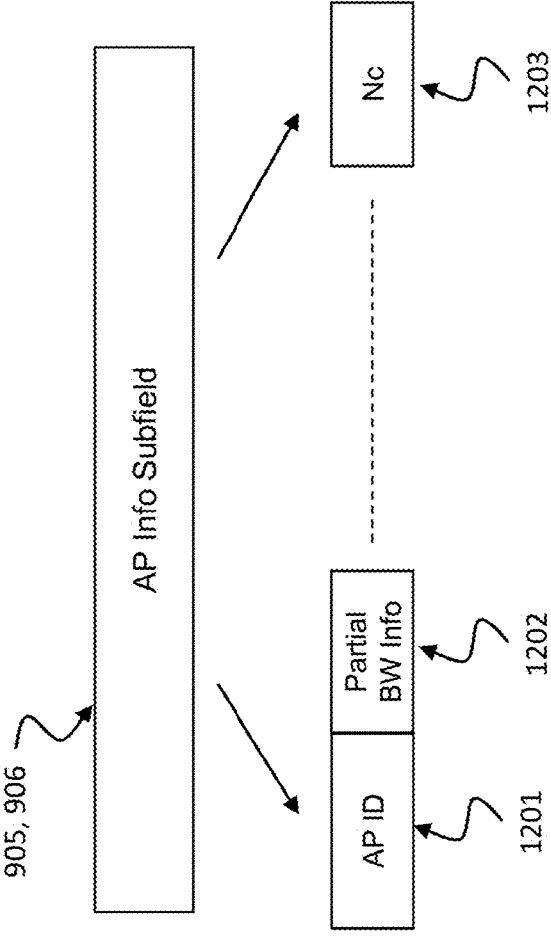
Figure 13:
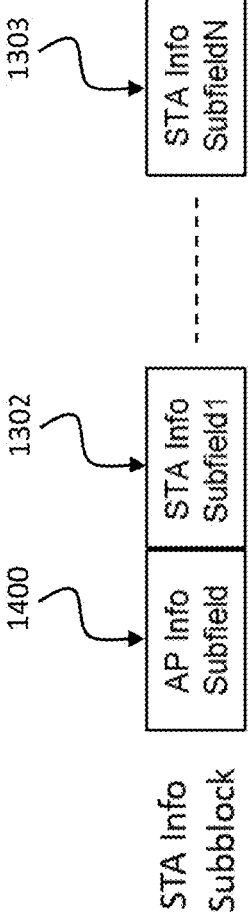
Figure 14:
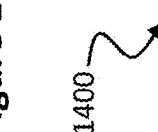
Figure 14:
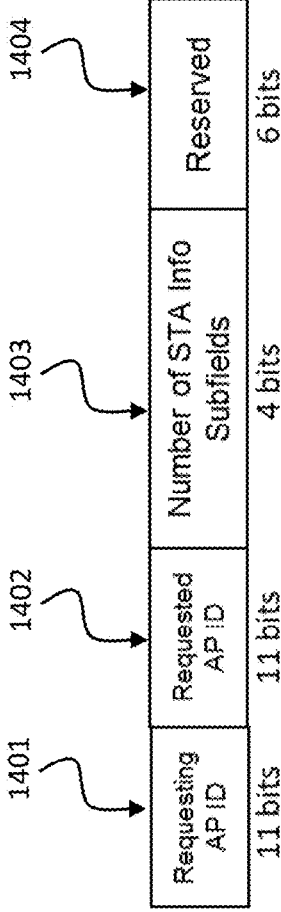
Figure 15:
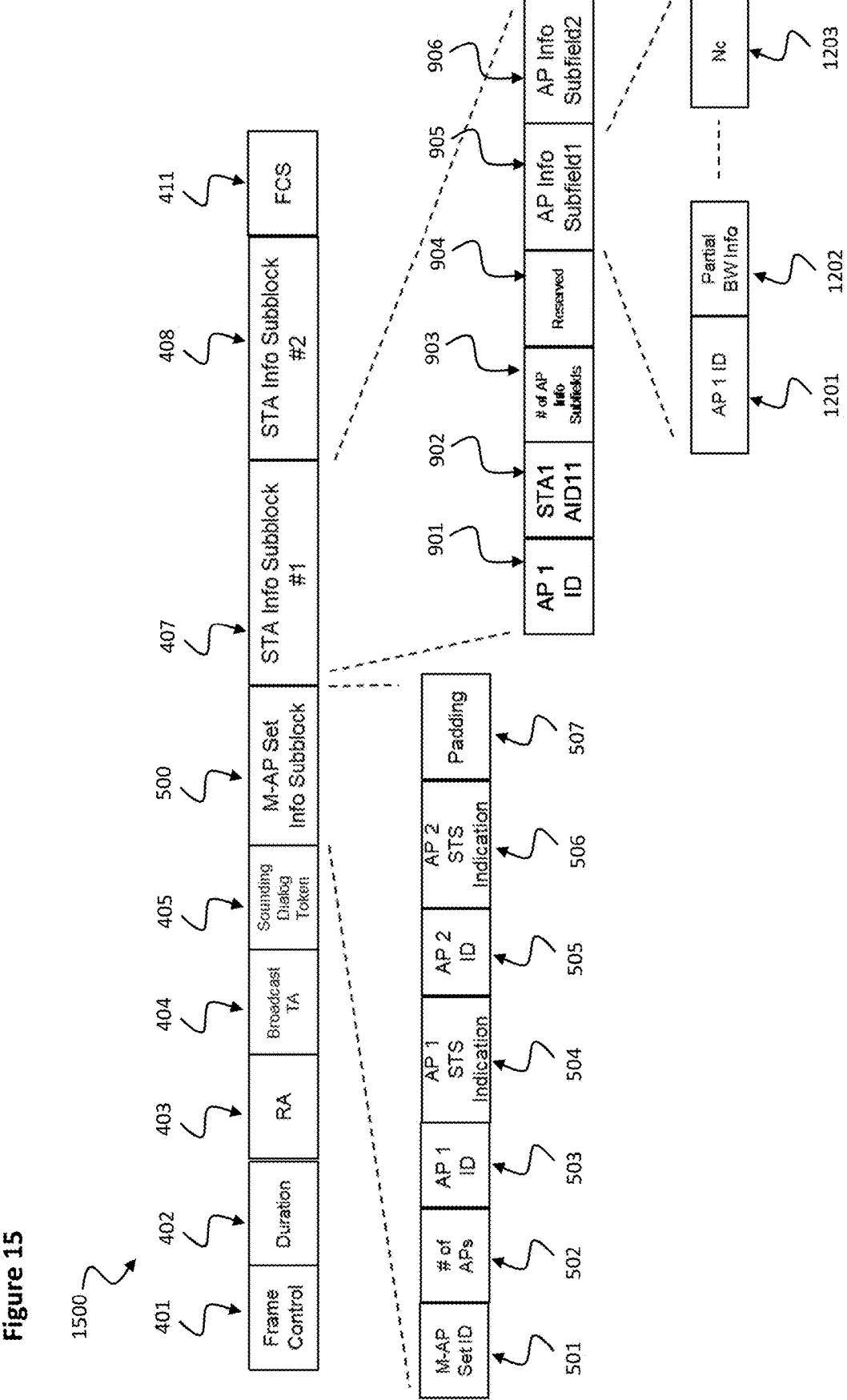

FIG. 7 shows an example for an STS indication 700 according to a second option;

FIG. 8 shows an example for an STS indication 800 according to a third option;

FIG. 9 shows an example for a STA Info Subblock 900 according to a first variant of a first option;

FIG. 10 shows an example for a STA Info Subblock 1000 according to a second variant of the first option;

FIG. 11 shows an example for a STA Info Subblock 1100 according to a third variant of the first option;

FIG. 12 shows an example for an AP Info Subfield 905, 906 according to the first option of the STA Info Subblock;

FIG. 13 shows an example for a STA Info Subblock 1300 according a second option;

FIG. 14 shows an example for an AP Info Subfield 1400 according to the second option of the STA Info Subblock;

FIG. 15 shows an example for a Joint NDPA frame 1500 according to a first option;

Figure 16:
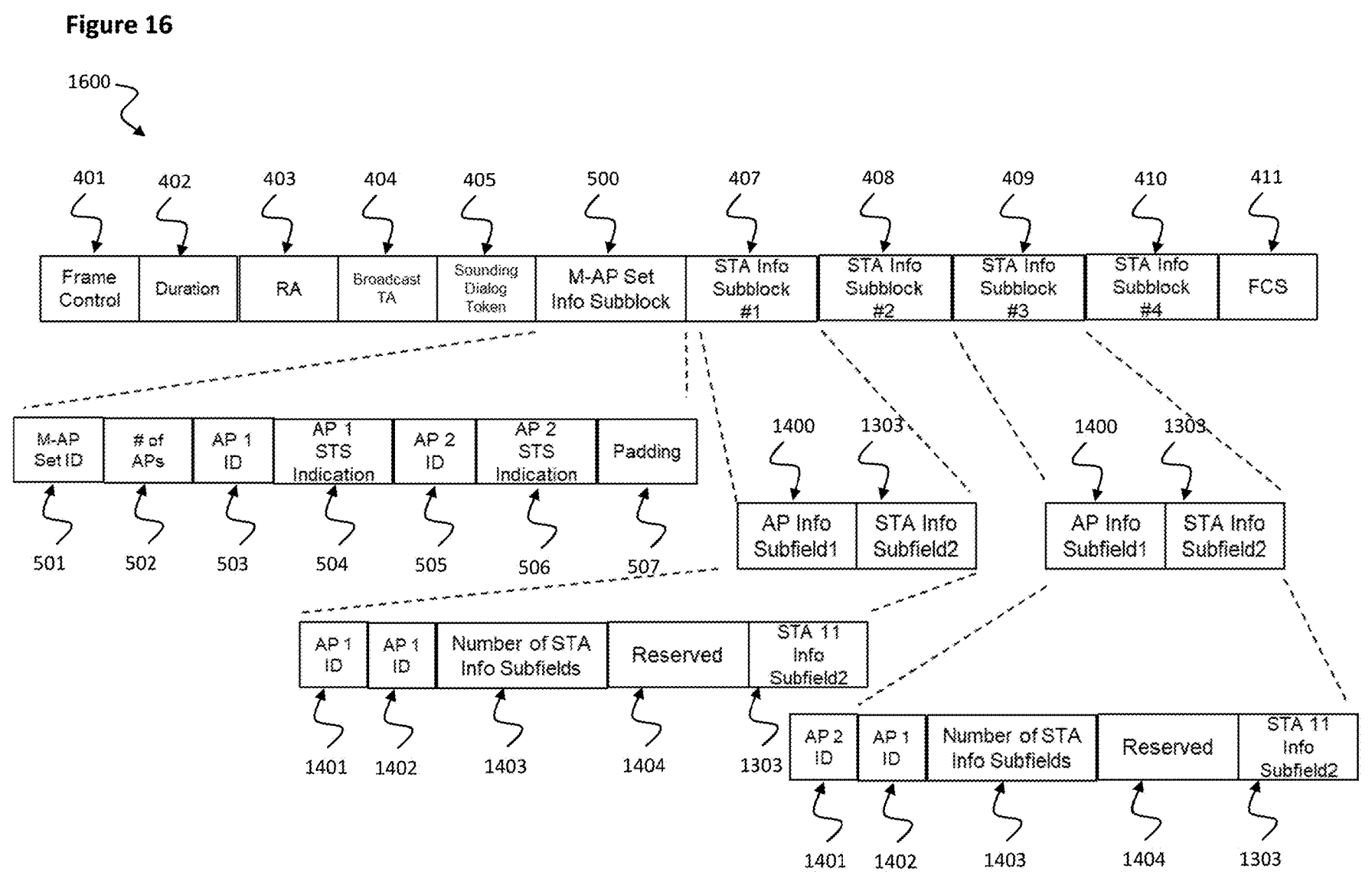

FIG. 16 shows an example for a Joint NDPA frame 1600 according to a second option;

FIG. 17 shows a schematic diagram illustrating a method 1700 for announcing a M-AP Joint channel sounding procedure in a WiFi network according to the disclosure.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods, devices and systems described herein may be implemented in wireless communication schemes, in particular communication schemes according to WiFi communication standards according to IEEE 802.11, in particular 802.11n/ac/ax versions of the WiFi standard and the latest 802.11be version of the WiFi standard. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender). However, devices described herein are not limited to transmit and/or receive radio signals, also other signals designed for transmission in deterministic communication networks may be transmitted and/or received.

The devices and systems described herein may include processors or processing devices, memories and transceivers, i.e. transmitters and/or receivers. The term "processor" or "processing device" describes any device that can be utilized for processing specific tasks (or blocks or steps). A processor or processing device can be a single processor or a multi-core processor or can include a set of processors or can include means for processing. A processor or processing device can process software or firmware or applications, etc.

FIG. 1 shows a flow diagram illustrating a Joint sounding procedure 100 according to the disclosure.

The Sharing AP that is an EHT AP which obtains a TXOP and initiates the Multi-AP coordination according to IEEE 802.11be, transmits a Joint Sounding Trigger frame 101. Then, the sharing AP and shared APs, that are EHT APs which are coordinated for the Multi-AP transmission by the Sharing AP according to IEEE 802.11be, transmit Joint AP NDPA frame 102, Joint NDP P-Matrix Based LTFs frame 103 and Joint BFRP (beamforming report) frame 104. Finally, BFR frame 105 is transmitted.

The Joint sounding procedure 100 is based on principles of channel sounding defined in the WiFi standard IEEE 802.11ax, where the sounding procedure consists of a sequence of several frames that are NDPA, NDP and TF. NDPA announces the sounding procedure and includes information regarding sounding feedback parameters for all the requested STAs. NDP follows NDPA and includes only preamble portion to allow channel measurement. Trigger Frame (TF) and Feedback Report; Feedback report may be transmitted immediately after NDP when single STA is indicated by NDPA or triggered by TF otherwise.

The Joint sounding procedure 100 assumes that multiple APs transmit simultaneously sounding frames to multiple STAs associated with different APs. The design of the frame formats as presented in this disclosure considers the following principles of Joint sounding: 1) In Joint Sounding 100, all the participated APs within M-AP set transmit NDPA 102 and NDP 103 in parallel; each AP uses different space-time streams. 2) In Joint Sounding, STAs may need to distinguish between transmitting APs and know which STSs are transmitted by each AP within M-AP set (i.e. whether it is associated AP or OBSS (overlapping basic service set) AP). 3) In some M-AP coordination schemes, different APs may request different sounding parameters from each STA (e.g. Ng, Codebook Size) whether it is associated STA or OBSS STA.

In the following, a new frame format for NDPA frame 102 is defined and a new design and new modules for the Joint Sounding procedure 100 is provided. The new format for the NDPA frame 102 is based on the two fundamental properties required by Joint NDPA 102 for Joint Sounding: A special TA indication is introduced that prevents Legacy devices from decoding this NDPA type. An indication of both M-AP Set ID and all the AP IDs is provided to allow correct operation of all the receivers. New modules are introduced allowing flexible indication of all the sounding parameters requested by the APs from specific STAs. New efficient STS indication per AP is introduced. New STA/M-AP Info Sub-blocks are designed. New AP Info Subfield is designed to allow indication of a specific AP info.

Figure 2:
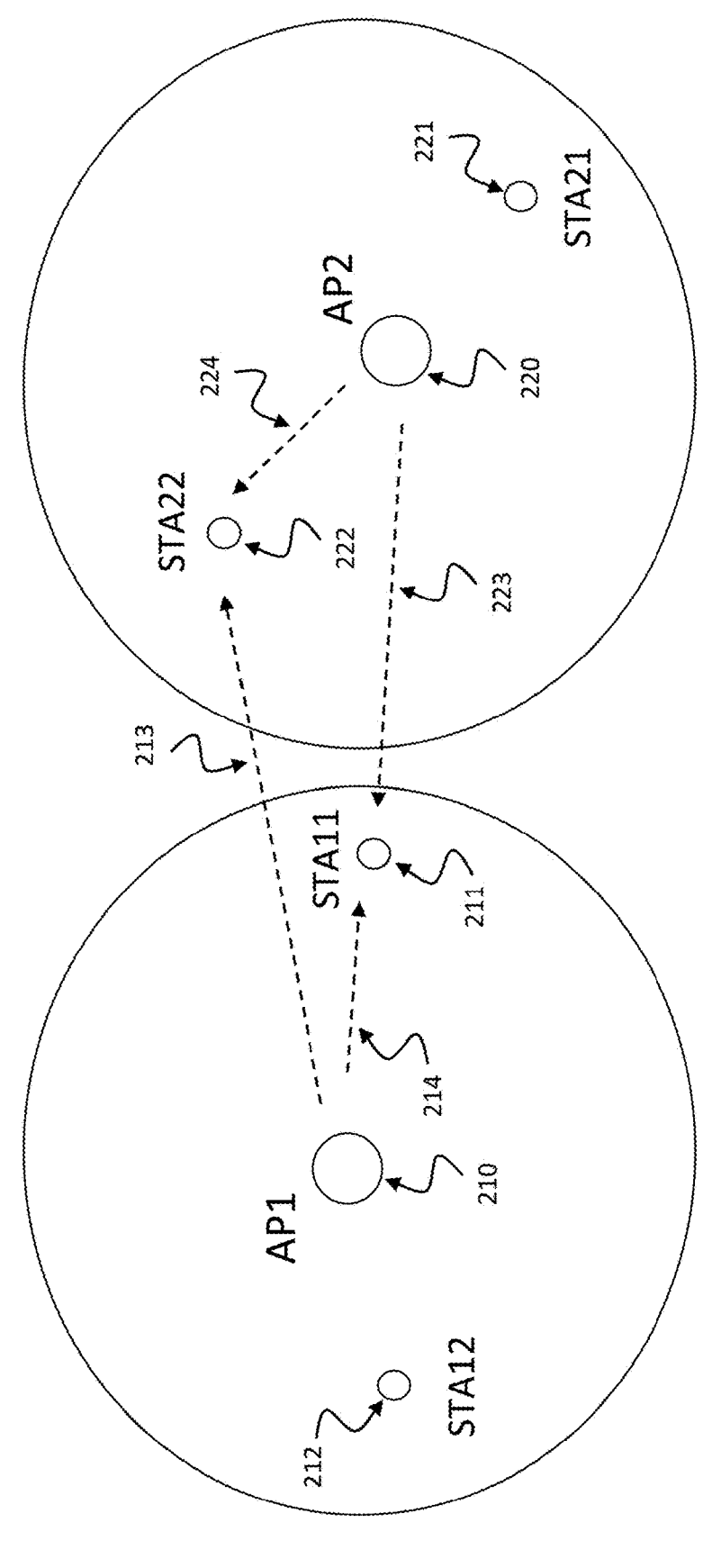
FIG. 2 shows an example scenario for an M-AP Joint sounding scheme 200 according to the disclosure.

FIG. 2 shows an example scenario for an M-AP Joint sounding scheme 200 according to the disclosure.

In this example scenario, there are two APs 210, 220, referred to as AP1 and AP2 in one M-AP Set. There are two STAs 211, 212, referred to as STA11 and STA12 associated with AP1 and two STAs 221, 222, referred to as STA21 and STA22 associated with AP2. Both APs 210, 220 request feedback 213, 214, 223, 224 from STA11 and STA22 with different sounding parameters.

In this example scenario, there are four pairs of sounding parameters to indicate. These four pairs of sounding parameters can be split into two blocks, where each block is related to a specific STA. Each block can indicate a single receiver (STA) and multiple transmitters (AP). Each block can include receiver and transmitter unique identifiers within M-AP set and sounding parameters.

Figure 3:
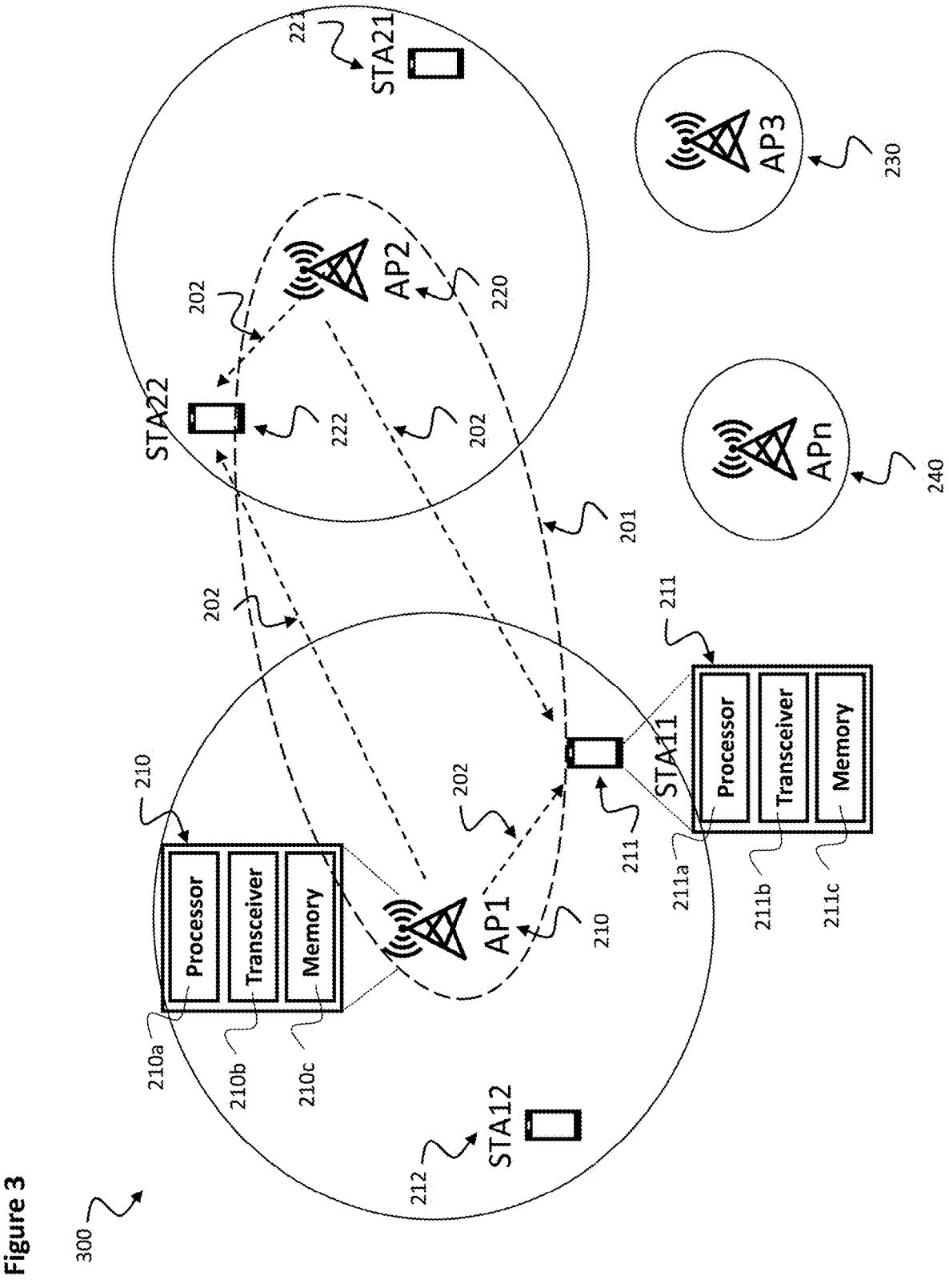
FIG. 3 shows an exemplary WiFi communication network 300 performing an M-AP Joint channel sounding procedure according to the disclosure.

FIG. 3 shows an exemplary WiFi communication network 300 performing an M-AP Joint channel sounding procedure according to the disclosure.

The WiFi communication network 300 comprises an exemplary quantity of n Access Points 210, 220, 230, 240 which are belonging to the same M-AP set and an exemplary quantity of stations (STAs) 211, 212, 221, 222. Each AP comprises a processor 210a, a transceiver 210b and a memory 210c for performing an M-AP Joint channel sounding procedure 100 as described above with respect to FIG. 1. Each STA comprises a processor 211a, a transceiver 211b and a memory 211c for performing the M-AP Joint channel sounding procedure 100 as described above with respect to FIG. 1. In this example, an exemplary quantity of APs, the APs 210 and 220 are associated to a subset 201 of APs which subset 201 includes APs 210, 220 that are configured to transmit an announcement frame 202, while APs 230 and 240 that indeed belong to the M-AP set, are not associated to the subset 201 of APs which are configured to transmit the announcement frame 202. For simplicity reasons, only the two APs 210 and 220 are associated to the subset 201. It understands that this subset can include a larger quantity of APs, it may even include the whole number of APs belonging to the M-AP set.

The APs 210 and 220 in the WiFi communication network 300 can be referred by the general term "network device", since they are devices in the WiFi network 300. In the following, AP 210 is exemplarily described. It understands that the same description applies for AP 220 and all other APs (not shown in the example of FIG. 3) that are associated to the subset 201 of APs that are configured to transmit the announcement frame 202.

The WLAN network 300 includes a network device 210 for announcing a Multi-Access Point (M-AP) Joint channel sounding procedure, e.g. a M-AP Joint channel sounding 100 as described in FIG. 1, in a WiFi network 300 for acquiring channel state information (CSI) between multiple Access Points (APs) which belong to the same M-AP set 210, 220, 230, 240, and multiple stations (STAs) 211, 212, 221, 222 associated with at least one of those multiple APs. The network device 210 is an Access Point of a subset 201 of the M-AP set 210, 220, 230, 240 which subset 201 includes APs 210, 220 that are configured to transmit an announcement frame 202, e.g. a joint NDPA frame 102 as described in FIG. 1.

The network device 210 comprises a processor 210a configured to provide the announcement frame 202 of the M-AP Joint channel sounding procedure 100, wherein the announcement frame 202 comprises an identification of the M-AP set 210, 220, 230, 240 and identifications of the APs 210, 220 (AP IDs) associated to the subset 201 of the M-AP set 210, 220, 230, 240 which subset 201 of APs 210, 220 is configured to transmit the announcement frame 202.

The network device 210 comprises a transceiver 210b configured to transmit the announcement frame 202.

The announcement frame 202 may be a Joint Null Data Packet Announcement (Joint NDPA) frame 102 of a new frame type that is different from existing NDPA frame types according to the IEEE 802.11be WiFi standard.

The Joint NDPA frame 102 may be transmitted on the same time-frequency resources with the same payload information by all APs 210, 220 belonging to the subset 201 of the M-AP set 210, 220, 230, 240 which subset 201 is configured to transmit the announcement frame 202.

Figure 4:
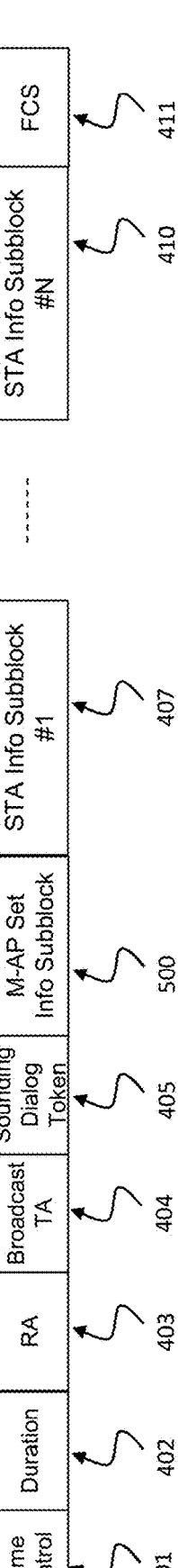
FIG. 4 shows an example for a Joint NDPA frame format 400 according to the disclosure.

The announcement frame 202 may comprise an indication of a broadcast transmitter address, TA 404, e.g. as shown in FIG. 4.

The announcement frame 202 may comprise an M-AP Set Info Subblock 500, e.g. as shown in FIG. 4, including information about the M-AP set 210, 220, 230, 240; and a plurality of STA Info Subblocks 407, 410, e.g. as shown in FIG. 4, indicating sounding parameters requested by one or more specific APs of the M-AP set 210, 220, 230, 240 from one or more specific STAs of the multiple STAs 211, 212, 221, 222.

Figure 5:
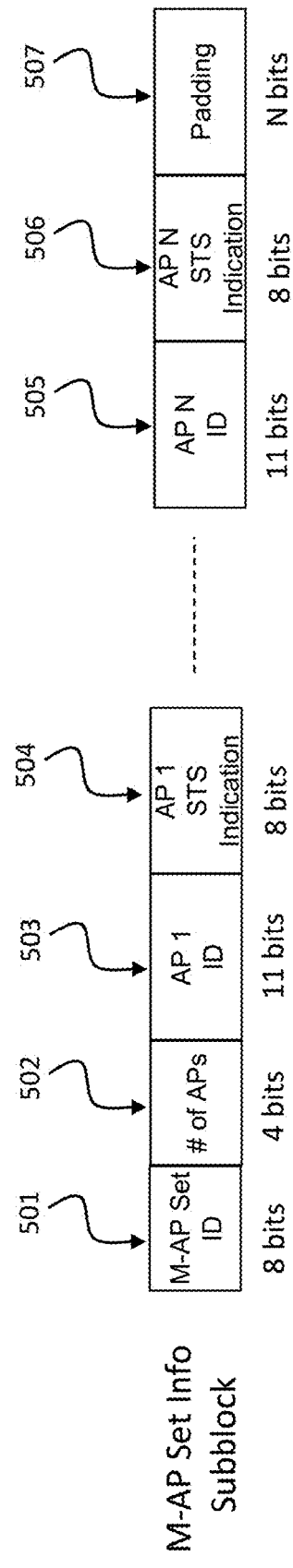
FIG. 5 shows an example for an M-AP Set Info Subblock format 500 according to the disclosure.

The M-AP Set Info Subblock 500 may comprise: the identification of the M-AP set (M-AP set ID) 501, e.g. as shown in FIG. 5; and the AP IDs 503, 505, e.g. as shown in FIG. 5, belonging to the subset 201 of the M-AP set 210, 220, 230, 240 which subset 201 is configured to transmit the announcement frame 202.

The M-AP Set ID is a unique identification of the M-AP Set in order to distinguish the M-AP Set from other M-AP Sets.

The M-AP Set Info Subblock 500 may comprise: a quantity of APs 502, e.g. as shown in FIG. 5, transmitting the announcement frame 202 of the M-AP Joint channel sounding procedure 100.

The M-AP Set Info Subblock 500 may comprise: a space time stream, STS, indication 504, 506, e.g. as shown in FIG. 5, for all APs 210, 220 belonging to the subset 201 of the M-AP set 210, 220, 230, 240.

Figure 6:
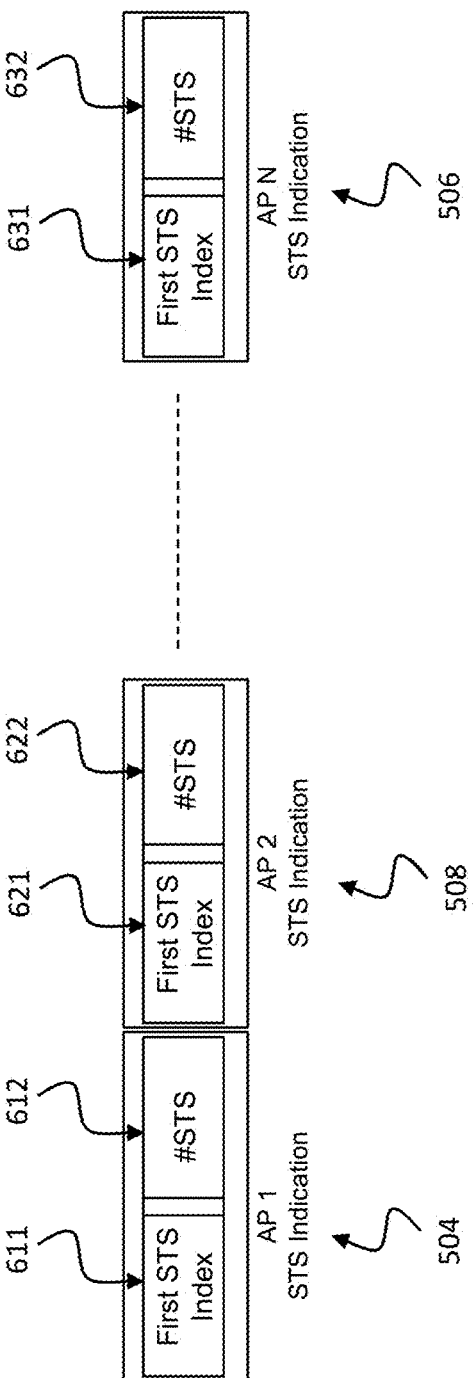
FIG. 6 shows an example for an STS indication 600 according to a first option.

According to a first option, the STS indication 504, 506 may comprise: an indication of a first STS 611, 621, 631, e.g. as shown in FIG. 6, allocated to a respective AP of the APs 210, 220 belonging to the subset 201 of the M-AP set 210, 220, 230, 240, and a quantity of STSs 612, 622, 632, e.g. as shown in FIG. 6, allocated to the respective AP.

According to a second option, the STS indication 504, 506 may comprise: a total number of STSs 701, e.g. as shown in FIG. 7, allocated to the APs 210, 220 belonging to the subset 201 of the M-AP set 210, 220, 230, 240 which subset 201 is configured to transmit the announcement frame 202, and an indication of a first STS 720, 730, e.g. as shown in FIG. 7, allocated per AP, the first STS indication 720, 730 starting from a second AP of the APs 210, 220 belonging to the subset 201 of the M-AP set 210, 220, 230, 240. A sequence of the APs, i.e. first AP, second AP, . . . , second last AP and last AP may be known.

According to a third option, the STS indication 504, 506 may comprise: a total number of STSs 701, e.g. as shown in FIG. 8, allocated to the APs 210, 220 belonging to the subset 201 of the M-AP set 210, 220, 230, 240, and an indication of a last STS 810, 820, e.g. as shown in FIG. 8, allocated per AP, the last STS indication 810, 820 ending with a second last AP of the APs 210, 220 belonging to the subset 201 of the M-AP set 210, 220, 230, 240. A sequence of the APs, i.e. first AP, second AP, . . . , second last AP and last AP may be known.

According to a first option, each STA Info Subblock 900, 1000, 1100, e.g. as shown in FIGS. 9, 10 and 11, of the plurality of STA Info Subblocks 407, 410 may indicate only one STA and one or more APs.

According to a second option, each STA Info Subblock 900, 1000, 1100, e.g. as shown in FIGS. 9, 10 and 11, of the plurality of STA Info Subblocks 407, 410 may indicate sounding parameters as requested by one or more APs from a specific STA.

According to the first option of the STA Info Subblock, each STA Info Subblock 900, 1000, 1100 of the plurality of STA Info Subblocks 407, 410 may comprise an identification 901, 902, e.g. as shown in FIGS. 9, 10 and 11, of the specific STA, wherein the identification 901, 902 of the specific STA comprises a combination of: an AP ID 901 of an AP of the M-AP set 210, 220, 230, 240 with which AP the specific STA is associated with; and a STA identification AID11, 902 as defined by the IEEE 802.11ax WiFi standard.

AID11 is defined by IEEE 802.11ax and reused by IEEE 802.11be.

According to the first option of the STA Info Subblock, each specific STA Info Subblock 900, 1000, 1100 of the plurality of STA Info Subblocks 407, 410 comprises a quantity of AP Info Subfields 903, e.g. as shown in FIGS. 9, 10 and 11, indicating a quantity of APs that request sounding parameters from the specific STA indicated by the specific STA Info Subblock.

According to the first option of the STA Info Subblock, each specific STA Info Subblock 900, 1000, 1100 of the plurality of STA Info Subblocks 407, 410 may comprise an AP Info Subfield 905, 906, e.g. as shown in FIGS. 9 to 12, the AP Info Subfield 905, 906 comprising: an indication of a specific AP 1201, e.g. as shown in FIG. 12, of the M-AP set 210, 220, 230, 240 which requests the sounding parameters from the specific STA, and the sounding parameters 1202, e.g. as shown in FIG. 12, requested by the specific AP.

According to the first option of the STA Info Subblock, a format of the AP Info Subfield 905, 906 may correspond to a format of a STA Info Subfield as defined by the IEEE 802.11be WiFi standard in which an AID11 field is replaced by an indication of the specific AP 1201 of the M-AP set 210, 220, 230, 240 which requests the sounding parameters from the specific STA indicated by the specific STA Info Subblock.

According to a second and third variant of the first option of the STA Info Subblock, each STA Info Subblock 1000, 1100 of the plurality of STA Info Subblocks 407, 410 may comprise an indication format bit 1001, e.g. as shown in FIGS. 10 and 11, for indicating whether all APs that request sounding parameter from the specific STA request the same sounding parameters.

According to the second variant of the first option of the STA Info Subblock, the indication format bit 1001 may indicate different sounding parameters per AP.

According to the third variant of the first option of the STA Info Subblock, the indication format bit 1001 may indicate the same sounding parameters for all APs.

According to the second option of the STA Info Subblock, each STA Info Subblock 1300, e.g. as shown in FIG. 13, of the plurality of STA Info Subblocks 407, 410 may indicate sounding parameters as requested by a specific AP of the M-AP set 210, 220, 230, 240 from multiple STAs that are associated with the specific AP.

According to the second option of the STA Info Subblock, a STA Info Subblock 1300 of the plurality of STA Info Subblocks 407, 410 may comprise an AP Info Subfield 1400, e.g. as shown in FIGS. 13 and 14, the AP Info Subfield 1400 comprising: an indication of a specific AP 1401, e.g. as shown in FIG. 14, of the M-AP set 210, 220, 230, 240 which requests the sounding parameters, an indication of a specific AP 1402, e.g. as shown in FIG. 14, of the M-AP set 210, 220, 230, 240 with which the one or more specific STAs of the multiple STAs are associated with, and a quantity of STA Info Subfields 1403, e.g. as shown in FIG. 14, included in the AP Info Subfield 1400.

According to the second option of the STA Info Subblock, the STA Info Subblock 1300 may comprise a plurality of STA Info Subfields 1302, 1303, e.g. as shown in FIG. 13, according to the quantity of STA Info Subfields included in the AP Info Subfield 1400.

According to the second option of the STA Info Subblock, a format of the STA Info Subfields 1302, 1303 may correspond to a format of a STA Info Subfield as defined by the IEEE 802.11be WiFi standard.

The WLAN network 300 includes one or more stations (STAs), i.e. user devices.

The station 211 comprises a transceiver 211b and a processor 211a and an optional memory 211c. The transceiver 211b is configured to receive an announcement frame 202 for announcing a Multi-Access Point (M-AP) Joint channel sounding procedure 100 in the WiFi network 300 for acquiring channel state information (CSI) between multiple Access Points (APs) which belong to the same M-AP set 210, 220, 230, 240 and multiple stations 211, 212, 221, 222 associated with at least one of those multiple APs. The announcement frame 202 is received from an AP 210, 220 of the subset 201 of the M-AP set 210, 220, 230, 240 which subset 201 includes APs that are configured to transmit the announcement frame 202.

The station 211 comprises a processor 211a, configured to determine, based on the announcement frame 202, an identification of the M-AP set (M-AP set ID) and identifications of the APs (AP IDs) associated to the subset 201 of the M-AP set 210, 220, 230, 240 which subset 201 of APs 210, 220 is configured to transmit the announcement frame 202.

FIG. 4 shows an example for a Joint NDPA frame format 400 according to the disclosure. The announcement frame 202 described above with respect to FIG. 3 may correspond to this Joint NDPA frame.

The Joint NDPA frame format 400 includes the following data fields: Frame Control 401, Duration 402, Receiver Address (RA) 403, Broadcast Transmitter Address (TA) 404, Sounding Dialog Token 405, M-AP Set Info Subblock 500, STA Info Subblock #1 407, further STA Info Subblocks, STA Info Subblock #N 410 and FCS (Frame Check Sequence) 411.

In the following, relevant data fields that are novel over the Joint NDPA frame format defined by IEEE 802.11be are described in more detail.

The new frame format of Joint NDPA frame 400 includes the following indication fields and parameters.

1) Indication of broadcast transmitter address (TA) 404. This parameter indicates STA that this NPDA is of type Joint and also prevents Legacy clients from detecting the rest of the frame. The format of the broadcast TA 404 is not part of this disclosure. It may be defined according to the specific requirements. In this disclosure it is only defined that every Joint NDPA frame should indicate broadcast TA.

2) M-AP Set Info Subblock 500. This field includes the following information:

a) M-AP Set ID 501 (see FIG. 5). This field indicates that this NDPA frame is sent by APs that belong to specific M-AP set.

b) AP IDs 503, 505 (see FIG. 5). These parameters indicate the APs within M-AP set, indicated by M-AP Set ID that transmit current NDPA and following NDP frames.

c) Per AP Parameters 504, 506 (see FIG. 5). These parameters, for example, indicate quantity and indices of Space-Time-Streams (STS) to be allocated per AP in NDP frame.

3) STA Info Subblock 407, 410. This field includes all the relevant sounding information and parameters as requested by specific AP from specific STA. There may be several fields of this type.

M-AP Set Info Subblock 500 may always be the first block to allow all the STAs to distinguish relevant NDPA frames and continue detection process or ignore it otherwise.

Please note that throughout this disclosure the sizes of specific fields are provided as examples only. It understands that other sizes are possible as well.

FIG. 5 shows an example for an M-AP Set Info Subblock format 500 according to the disclosure. M-AP Set Info Subblock 500 includes the following indication fields:

1) M-AP Set ID 501. This is a special unique identifier that distinguish this specific M-AP set from other M-AP sets in the WiFi network. The format of M-AP Set ID is not part of this disclosure.

2) Quantity of APs 502 transmitting current NDPA frame and following NDP frame.

3) AP ID 503, 505 and AP STS Indication 504, 506. These are pairs per AP indication. The total number of pairs is indicated by quantity of APs 502.

a) AP ID 503, 505 is a unique AP identifier within a specific M-AP set.

b) AP STS indication 504, 506 are indicating STSs that are allocated for the specific AP within NDP frame. There are several indication methods described below with respect to FIGS. 6 to 8.

The above described indication fields are limited by a padding field 507.

For AP STS indication 504, 506, three different methods (also called options) to indicate STS (quantity and indices per AP) are described in the following with respect to FIGS. 6 to 8.

FIG. 6 shows an example for an STS indication 600 according to a first option.

This first option is to indicate start STS 611, 621, 631 and quantity of STS 612, 622, 632 per AP. If, for example, maximum number of STS is 16, then 4 bits are used to indicate first STS allocated to each AP and another 4 bits to indicate quantity of STS allocated to each AP.

FIG. 7 shows an example for an STS indication 700 according to a second option.

The second option is to indicate total number of STS 701 and first index of STS 720, 730 per AP. In this method all the APs are organized according to indices of allocated STS, while first AP will start from first STS index (this may be 1 or 0). Thus, there is no need to indicate it explicitly. Each AP will check the first STS of the next AP to obtain quantity of STSs that are allocated to it.

FIG. 8 shows an example for an STS indication 800 according to a third option.

The third option is to indicate the total number of STS 701 and the last index of STS 810, 820 per AP. In this method all the APs are organized according to indices of allocated STS, while last AP will always end by index equal to total number of STS. Thus, there is no need to indicate it explicitly. Each AP will check the last STS of the next AP to obtain quantity of STSs that are allocated to it.

FIGS. 9 to 14 show different examples for a STA Info Subblock 900 according to different options.

The STA Info Subblock indicates sounding parameters that are requested by a specific AP from a specific STA. In the following, two options for the structure of the STA Info Subblock are presented.

According to a first option, each STA Info Subblock indicates all the sounding parameters as requested by multiple APs from specific STA. In this case each STA Info Subblock includes only one STA and may include multiple APs. For each STA there is only one STA Info Subblock within a single NDPA frame.

According to a second option, each STA Info Subblock indicates all the sounding parameters as requested by a specific AP from multiple STAs that are associated with the specific AP (not necessarily the same AP as indicated by current STA Info Subblock).

According to the first option, the format of STA Info Subblock 900, 1000, 1100 (see FIGS. 9 to 11) includes the following fields:

1) Unique STA Identification 901, 902 combined of two fields:
   a) AP ID. This is the indication of AP that current STA is associated with.
   b) AID11. This is the STA ID of 11 bits as defined by 802.11ax.
2) Quantity of AP Info Subfields 903. This number indicates the number of APs that request sounding from this STA.
3) Indication Format Bit 1001 (see FIGS. 10 and 11). These bits are used to indicate whether all the APs request sounding feedback with exactly the same parameters. For example, when Indication Format Bit 1001 equals logic '0', sounding parameters are indicated only once within first AP Info Subfield. The rest of APs are indicated only by AP ID (this can shorten the total size of STA Info Subblock). Otherwise each AP Info Subfield includes different sounding parameters. Indication Format Bit 1001 may also be reserved 904 and then all the AP Info Subfield include different sounding parameters.
4) AP Info Subfield 905, 906 (see FIGS. 9 to 11). This field indicates a specific AP and the sounding parameters requested by this specific AP.

FIG. 9 shows an example for a STA Info Subblock 900 according to a first variant of the first option. In this first variant, Indication Format Bit is reserved 904.

FIG. 10 shows an example for a STA Info Subblock 1000 according to a second variant of the first option. In this second variant, Indication Format Bit 1001 is defined and indicates different sounding parameters per AP.

FIG. 11 shows an example for a STA Info Subblock 1100 according to a third variant of the first option. In this third variant, Indication Format Bit 1001 is defined and indicates the same sounding parameters for all the APs.

FIG. 12 shows an example for an AP Info Subfield 905, 906 according to the first option of the STA Info Subblock.

The AP Info Subfield 905, 906, as introduced above with respect to FIGS. 9 to 11, contains sounding parameters requested by a specific AP from the STA indicated within STA Info Subblock. The format of AP Info Subfield is similar to the STA Info Subfield as defined by 802.11ax, where the AID11 is replaced by AP ID 1201. The rest of fields 1202, 1203 are the same fields as in STA Info Subfield defined by 802.11ax.

FIG. 13 shows an example for a STA Info Subblock 1300 according the second option. The format of STA Info Subblock includes the following fields:

1) AP Info Subfield 1400 (see also FIG. 14). This field indicates the AP that requests the sounding and the AP that all the STAs within this STA Info Subblock are associated with. The AP Info Subfield 1400 includes the following fields (as shown in FIG. 14):
   a) Requesting AP ID 1401.
   b) AP ID 1402 that STAs are associated with.
   c) Quantity of STA Info Subfields 1304.
2) STA Info Subfields 1302, 1303. These are the STA Info Subfields per STA.

FIG. 14 shows an example for an AP Info Subfield 1400 according to the second option of the STA Info Subblock. The AP Info Subfield 1400 includes the following fields:
   a) Requesting AP ID 1401.
   b) AP ID 1402 that STAs are associated with.
   c) Number of STA Info Subfields 1304.
   d) a reserved field 1404 may follow.

In this second option of the STA Info Subblock, the STA Info Subfield format of 802.11ax is reused.

FIG. 15 shows an example for a Joint NDPA frame 1500 according to a first option. This Joint NDPA frame 1500 may be applied in an example scenario as described above with respect to FIG. 2, where two APs 210, 220, referred to as AP1 and AP2 are in one M-AP Set, two STAs 211, 212, referred to as STA11 and STA12 are associated with AP1 and two STAs 221, 222, referred to as STA21 and STA22 are associated with AP2. Both APs 210, 220 request feedback 213, 214, 223, 224 from STA11 and STA22 with different sounding parameters.

The structure of the Joint NDPA frame 1500 corresponds to the Joint NDPA frame 400 shown in FIG. 4 in which only two STA Info Subblocks 407, 408 are defined.

The structure of the M-AP Set Info Subblock 500 corresponds to the M-AP Set Info Subblock 500 shown in FIG. 5 in which only two AP STS Indication fields 504, 506 are defined.

The structure of the STA Info Subblock #1 407 (and also of STA Info Subblock #2 408) corresponds to the STA Info Subblock 900 according to the first option as shown in FIG. 9 in which only two AP Info Subfields 905, 906 are defined.

The structure of the AP Info Subfield 1, 905 (and also of AP Info Subfield 2, 906) corresponds to the AP Info Subfield 905, 906 shown in FIG. 12.

FIG. 16 shows an example for a Joint NDPA frame 1600 according to a second option. This Joint NDPA frame 1500 may also be applied in the example scenario as described above with respect to FIG. 2, where two APs 210, 220 are in one M-AP Set, two STAs 211, 212 are associated with AP1 and two STAs 221, 222 are associated with AP2. Both APs 210, 220 request feedback 213, 214, 223, 224 from STA11 and STA22 with different sounding parameters.

The structure of the Joint NDPA frame 1500 corresponds to the Joint NDPA frame 400 shown in FIG. 4 in which four STA Info Subblocks 407, 408, 409, 410 are defined.

The structure of the M-AP Set Info Subblock 500 corresponds to the M-AP Set Info Subblock 500 shown in FIG. 5 in which two AP STS Indication fields 504, 506 are defined.

The structure of the STA Info Subblock #1 407 (and also of STA Info Subblocks #2 408, #3 409 and #4, 410) corresponds to the STA Info Subblock 1300 according to the second option as shown in FIG. 13 in which only the AP Info Subfield 1400 together with a single STA Info Subfield 1303 are defined.

The structure of the AP Info Subfield 1400 corresponds to the AP Info Subfield 1400 shown in FIG. 14.

FIG. 17 shows a schematic diagram illustrating a method 1700 for announcing a M-AP Joint channel sounding procedure in a WiFi network according to the disclosure. The method 1700 may be performed in a WiFi network 300 as described above with respect to FIG. 3.

The method 1700 is for announcing a M-AP Joint channel sounding procedure 100 in a WiFi network 300 for acquiring channel state information between multiple Access Points, which belong to the same M-AP set 210, 220, 230, 240, and multiple stations 211, 212, 221, 222 associated with at least one of those multiple APs, e.g. as described above with respect to FIG. 3 and with respect to FIGS. 4 to 16.

The method 1700 comprises: providing 1701 an announcement frame 202, e.g. as shown in FIG. 3, of the M-AP Joint channel sounding procedure 100 by a subset 201 of the M-AP set 210, 220, 230, 240 which subset 201 includes APs that are configured to transmit the announcement frame 202, wherein the announcement frame 202 comprises an identification of the M-AP set, M-AP set ID, and identifications of the APs, AP IDs, associated to the subset 201 of the M-AP set which subset of APs is configured to transmit the announcement frame 202, e.g. as described above with respect to FIG. 3.

The method 1700 comprises: transmitting 1702 the announcement frame 202 by the subset 201 of the M-AP set which subset includes APs that are configured to transmit the announcement frame 202, e.g. by the transceivers of the corresponding APs 210, 220 associated to the subset 201 as described above with respect to FIG. 3.

The announcement frame 202 may be a Joint Null Data Packet Announcement, Joint NDPA, frame 102 of a new frame type that is different from existing NDPA frame types according to the IEEE 802.11be WiFi standard, e.g. as described above with respect to FIG. 3.

The method 1700 may comprise: transmitting the Joint NDPA frame 102, 202 on the same time-frequency resources with the same payload information by all APs belonging to the subset 201 of the M-AP set which subset is configured to transmit the announcement frame 202, e.g. as described above with respect to FIG. 3.

The present disclosure also supports a computer program product including computer executable code or computer executable instructions that, when executed, causes at least one computer to execute the performing and computing steps described herein, in particular the methods and procedures described above. Such a computer program product may include a readable non-transitory storage medium storing program code thereon for use by a computer. The program code may perform the processing and computing steps described herein, in particular the methods and procedures described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A network device for announcing a multi-access point (M-AP) Joint channel sounding procedure in a WiFi network for acquiring channel state information (CSI), between multiple access points (APs) that belong to a same M-AP set, and multiple stations (STAs) associated with at least one of the multiple APs, wherein the network device is an AP of a subset of the M-AP set, which subset includes APs that are configured to transmit an announcement frame, the network device comprising:
   a processor; and
   a memory including computer executable instructions that, when executed by the processor, facilitate the network device carrying out a method comprising providing the announcement frame of the M-AP Joint channel sounding procedure,
   wherein the announcement frame comprises:
      an identification of the M-AP set; and
      identifications of the APs (AP IDs) associated to the subset of the M-AP set, which subset of APs is configured to transmit the announcement frame.

2. The network device of claim 1, wherein the announcement frame is a Joint Null Data Packet Announcement (Joint NDPA) frame of a new frame type that is different from existing NDPA frame types according to IEEE 802.11be.

3. The network device claim 2, wherein the Joint NDPA frame is transmitted on same time-frequency resources with same payload information by all APs belonging to the subset of the M-AP set, and
   wherein the subset is configured to transmit the announcement frame.

4. The network device of claim 1, wherein the announcement frame comprises an indication of a broadcast transmitter address (TA).

5. The network device of claim 1, wherein the announcement frame comprises:
   an M-AP Set Info Subblock including information about the M-AP set; and a plurality of STA Info Subblocks indicating sounding parameters requested by one or more specific APs of the M-AP set from one or more specific STAs of the multiple STAs.

6. The network device of claim 5, wherein the M-AP Set Info Subblock comprises:

the identification of the M-AP set (M-AP set ID); and the AP IDs belonging to the subset of the M-AP set, wherein the subset is configured to transmit the announcement frame.

7. The network device of claim 6, wherein the M-AP Set Info Subblock comprises:

a quantity of APs transmitting the announcement frame of the M-AP Joint channel sounding procedure.

8. The network device of claim 6, wherein the M-AP Set Info Subblock comprises:

a space time stream (STS) indication for all APs belonging to the subset of the M-AP set.

9. The network device of claim 8, wherein the STS indication comprises:

an indication of a first STS allocated to a respective AP of the APs belonging to the subset of the M-AP set, and a quantity of STSs allocated to the respective AP.

10. The network device of claim 5, wherein each STA Info Subblock of the plurality of STA Info Subblocks indicates only one STA and one or more APs.

11. The network device of claim 5, wherein each STA Info Subblock of the plurality of STA Info Subblocks indicates sounding parameters as requested by one or more APs from a specific STA.

12. The network device of claim 5, wherein each specific STA Info Subblock of the plurality of STA Info Subblocks comprises a quantity of AP Info Subfields indicating a quantity of APs that request sounding parameters from a specific STA indicated by a specific one of the each specific STA Info Subblock.

13. The network device of claim 5, wherein each specific STA Info Subblock of the plurality of STA Info Subblocks comprises an AP Info Subfield, wherein the AP Info Subfield comprises:

an indication of a specific AP of the M-AP set which requests the sounding parameters from the specific STA, and the sounding parameters requested by the specific AP.

14. The network device of claim 5, wherein each STA Info Subblock of the plurality of STA Info Subblocks comprises an indication format bit for indicating whether all APs that request sounding parameter from the specific STA request the same sounding parameters.

15. The network device of claim 5, wherein each STA Info Subblock of the plurality of STA Info Subblocks indicates sounding parameters as requested by a specific AP of the M-AP set from multiple STAs that are associated with the specific AP.

16. The network device of claim 5, wherein a STA Info Subblock of the plurality of STA Info Subblocks comprises an AP Info Subfield, the AP Info Subfield comprising:

an indication of a specific AP of the M-AP set which requests the sounding parameters, an indication of a specific AP of the M-AP set with which the one or more specific STAs of the multiple STAs are associated with, and a quantity of STA Info Subfields included in the AP Info Subfield.

17. The network device of claim 16, wherein the STA Info Subblock comprises a plurality of STA Info Subfields according to the quantity of STA Info Subfields included in the AP Info Subfield.

18. A method for announcing a Multi-Access Point (M-AP) Joint channel sounding procedure in a WiFi network for acquiring channel state information (CSI) between multiple Access Points (APs) that belong to a same M-AP set, and multiple stations (STAs) associated with at least one of those multiple APs, the method comprising:

providing an announcement frame of the M-AP Joint channel sounding procedure by a subset of the M-AP set which subset includes APs that are configured to transmit the announcement frame, wherein the announcement frame comprises:

an identification of the M-AP set (M-AP set ID), and identifications of the APs (AP IDs) associated to the subset of the M-AP set, which subset of APs is configured to transmit the announcement frame.

19. The method of claim 18, comprising:

transmitting the announcement frame on the same time-frequency resources with the same payload information by all APs belonging to the subset of the M-AP set which subset is configured to transmit the announcement frame.

20. A station (STA) comprising:

a transceiver configured to receive an announcement frame for announcing a multi-access point (M-AP) Joint channel sounding procedure in a WiFi network for acquiring channel state information (CSI) between multiple access point (APs), which belong to a same M-AP set, and multiple stations (STAs) associated with at least one of the multiple APs, wherein the announcement frame is received from an AP of a subset of the M-AP set, which subset includes APs that are configured to transmit the announcement frame; and a processor configured to determine, based on the announcement frame:

an identification of the M-AP set (M-AP set ID), and identifications of the APs (AP IDs) associated to the subset of the M-AP set, which subset of APs is configured to transmit the announcement frame.

* * * * *